United States Patent
Morgan-Albertson et al.

(10) Patent No.: US 6,397,784 B1
(45) Date of Patent: Jun. 4, 2002

(54) ANIMAL RESTRAINT

(76) Inventors: Rebecca Morgan-Albertson; Cybele Geideman, both of 1454 Middle Burnt Fork Rd., Stevensville, MT (US) 59870; Loralee Gray, 4301 Aviation Way, Caldwell, ID (US) 83605

( * ) Notice: Subject to any disclaimer, the term of this patent is extended or adjusted under 35 U.S.C. 154(b) by 0 days.

(21) Appl. No.: 09/746,634

(22) Filed: Dec. 22, 2000

Related U.S. Application Data

(60) Provisional application No. 60/225,637, filed on Aug. 16, 2000.

(51) Int. Cl.$^7$ .......................... A01K 27/00; A01K 15/00
(52) U.S. Cl. ........................ 119/792; 119/856
(58) Field of Search .................. 119/769, 792, 119/795, 771, 907, 856, 863

(56) References Cited

U.S. PATENT DOCUMENTS

| | | | | |
|---|---|---|---|---|
| 3,769,939 A | * | 11/1973 | Wais et al. | 119/792 |
| 5,172,428 A | | 12/1992 | Sporn | 2/181 |
| 5,325,819 A | * | 7/1994 | Krauss | 119/792 |
| 5,329,885 A | | 7/1994 | Sporn | 119/864 |
| 5,335,627 A | | 8/1994 | Bandimere | 119/856 |
| 5,359,964 A | | 11/1994 | Sporn | 119/864 |
| 5,370,083 A | | 12/1994 | Sporn | 119/864 |
| 5,471,953 A | | 12/1995 | Sporn | 119/792 |
| 5,485,810 A | | 1/1996 | Sporn | 119/792 |
| 5,682,840 A | * | 11/1997 | McFarland | 119/856 |
| 5,713,308 A | | 2/1998 | Holt, Jr. | 119/856 |
| 5,743,216 A | * | 4/1998 | Holt, Jr. | 119/793 |
| 5,913,285 A | | 6/1999 | Pritchard | 119/771 |
| 5,920,963 A | | 7/1999 | Chou | 24/170 |
| 5,934,224 A | * | 8/1999 | Sporn | 119/792 |
| 6,085,694 A | | 7/2000 | Simon | 119/792 |

* cited by examiner

*Primary Examiner*—Thomas Price
(74) *Attorney, Agent, or Firm*—Reidlaw, L.L.C.; John S. Reid

(57) ABSTRACT

Apparatus and method for an animal restraint are provided, wherein the animal restraint can be fabricated from a single continuous piece of cord with a series of knots formed therein. The series of knots includes a slide knot through which two lengths of the cord are passed in a substantially side-by-side manner. The cord is configured to define a head hole, a first leg hole, and a second leg hole, wherein the sizes of the first and the second leg holes are adjustable by moving the two lengths of cord in an adjustably slidable manner through the slide knot.

21 Claims, 6 Drawing Sheets

ANIMAL RESTRAINT

RELATED CASES

This application claims priority to United States Provisional Patent Application No. 60/225,637, filed Aug. 16, 2000.

FIELD OF THE INVENTION

This invention relates to animal restraints, and more specifically, to animal restraint apparatus and methods for producing animal restraint apparatus.

BACKGROUND OF THE INVENTION

Various configurations of prior art animal restraints have been in wide-spread use. By "animal restraint" we mean an apparatus which is configured to limit the range of mobility of an animal relative to a given reference point. For example, prior art animal restraints in the form of harnesses have been used to limit the mobility of draft animals relative to a reference point which can be in the form of a load such as a cart, wagon, or sled. Prior art animal restraints in the form of harnesses and collars have also been used in combination with a lead, or leash, to limit the mobility of pet animals relative to a reference point such as the pet owner. An animal restraint can provide a means of controlling an animal during exercise or during medical examination of the animal, for example. An animal restraint can also be a useful tool for training an animal.

Referring to FIG. 1, a perspective view of a prior art animal restraint 10 is depicted. The prior art animal restraint 10 of FIG. 1 is shown to be generally configured as a dog harness, although it is understood that similar prior art harnesses have been configured for use as restraints for animals other than dogs. The prior art animal restraint 10 comprises various separate lengths of flexible belting 20 which can be in any of a number of various forms such as woven nylon webbing or leather strapping, or the like. Various openings 22 are formed in the belting 20 by way of stitchings 24.

The prior art animal restraint 10 also comprises a plurality of metal rings 32, 34. At least one of the metal rings 32 can be employed as a joint to join various lengths of belting 20 to one another as shown. Another of the rings 34 can be utilized as an attachment point for a lead or leash (not shown). Various metal buckles 36 are also included in the prior art animal restraint 10. The buckles 36 are employed to adjust the length of the various lengths of belting 20 in order to tailor the fit of the restraint 10 to the size of the animal by which the restraint is worn.

Fastener portions 42, 44 are also included in the prior art animal restraint 10 in order to securely place the restraint on the animal by which it is worn. A first fastener portion 42 is configured to releasably fasten to a second fastener portion 44. Other alternative configurations of fasteners (not shown) have been used. When the first and second fastener portions 42, 44 are fastened to one another, the prior art restrain forms a front loop 52 and a rear loop 54. The front loop 52 is generally configured to be placed around the neck or upper chest and in front of the fore limbs of an animal, while the rear loop 54 is generally configured to be placed around the chest of the animal and behind the fore limbs.

As is seen, the prior art animal restraint 10 harness comprises various separate parts and components such as belting lengths 20, stitchings 24, metal rings 32, buckles 36, and fastener portions 42, 44. This can result in a relatively high number of parts and components which are subject to wear, breakage, or malfunction. For example, the stitchings 24 can become worn and frayed, resulting in weakening of the restraint 10. Also, the belting lengths 20 can become worn due to rubbing against one another or against the metal rings 32, 34. The metal parts such as the rings 32, 34 and buckles 36 can become corroded. The relatively high number of components of the prior art restraint 10 can also result in a relatively complex fabrication procedure.

In addition, the several buckles 36 as well as the fastener portions 42, 44 can lead to difficulty of use or confusion of the user when the user attempts to place the restraint 10 on an animal. This can be especially so in cases where the user has an incapacity of some sort, such as loss of use of a hand, or poor sight. Furthermore, the prior art restraint 10 harness can be uncomfortable for the animal by which it is worn. Such discomfort can be caused by edges of the belting lengths 20 digging in to the animal, and especially so if the belting lengths become twisted.

Also, the animal can suffer discomfort due to the relatively high weight of the prior art restraint 10, which in turn, is due to the many parts, including various metal parts, which make up the restraint. Finally, the use of belting 20 limits the size of the prior art restraint 10 harness that can be constructed, precluding the use of such a restraint on relatively small animals such as mice and the like.

Other configurations of prior art animal restraints have also been used. Turning to FIG. 2, a perspective view of a prior art restraint 20 in the form of a dog collar is depicted. As in the case of the animal restraint 10 discussed above for FIG. 1, it is understood that collars similar to the prior art animal restraint 20 depicted in FIG. 2 have been used on animals other than dogs. The prior art animal restraint 20 collar comprises a belt length 60 which can be in any of a number of forms, including woven nylon webbing, leather strapping, or the like.

The prior art animal restraint 20 also comprises at least one fastener portion 64 which is configured to fasten the ends of the belt length 60 into a closed loop when placed around an animal's neck. The prior art restraint 20 can also comprise at least one metal ring 62 which is attached to the length of belting 60, and which can be employed as an attachment point for a lead or leash (not shown).

It is seen that the prior art animal restraint 20 collar is somewhat less complex than the animal restraint 10 harness which is depicted in FIG. 1. However, the animal restraint 20 depicted in FIG. 2 can be unreliable as well as dangerous. If the prior art animal restraint 20 collar is placed to loosely around the neck of an animal, it could unexpectedly come off of the animal by sliding from the neck and past the head of the animal. Of course, this can be a very undesirable occurrence in situations where the animal must be restrained.

The prior art animal restraint 20 collar can also prove to be dangerous and even deadly in the event that the restraint is placed too tightly around the neck of the animal. Numerous animals have been seriously injured or killed by strangulation in cases where a tightly fitting prior art restraint collar such as the restraint 20 becomes ensnared by an object which is too far above the ground for the animal to stand.

Moving now to FIG. 3, yet another prior art animal restraint 30 in the form of a choker is shown. The animal restraint 30 choker generally comprises a length of metal chain 80 as well as a pair of metal rings 82, 84. A first metal ring 82 is attached to one end of the length of metal chain 80 while a second metal ring 84 is attached to the other end of the length of chain. The length of chain 80 is passed through the first metal ring 82 to form a loop as shown. The loop formed by the chain 80 is passed over an animal's head and placed around the animal's neck. A lead or leash (not shown) can be connected to the first ring 82. In that case, since the loop must be big enough to fit around the animal's head, there is a possibility that the restraint 30 can be pulled off the animal if enough force is exerted.

Alternatively, the lead can be connected to the second ring 84 in which case the chain can become cinched tightly around the animal's neck, and from which case the name "choker" is derived. In either case, problems are associated with the use of the prior art animal restraint 30 choker. On the one hand, if the lead is connected to the first ring 82, the restraint 30 can be relatively easily pulled off of the animal. On the other hand, if the lead is connected to the second ring 84, the restraint 30 can actually choke the animal due to the constricting nature of the chain wrapping tightly around the animal's neck. The use of the prior art restraint 30 as a choker is considered by many to be inhumane.

As is seen from the above discussion of the prior art animal restraints 10, 20, 30 depicted in FIGS. 1, 2 and 3, respectively, several problems are associated with their use. Therefore it has long been known that it would be desirable to provide an animal restraint which achieves the benefits to be derived from similar prior art devices, but which avoids the shortcomings and detriments individually associated therewith.

SUMMARY OF THE INVENTION

In accordance with a first embodiment of the invention, the invention generally includes an animal restraint apparatus comprising a cord having a series of stop knots and a slide knot formed therein. The cord and knots together define a head hole, a first leg hole and a second leg hole, wherein the sizes of the first and the second leg holes are adjustable by adjustably sliding two lengths of the cord through the slide knot. In accordance with a second embodiment of the invention, another animal restraint apparatus is provided which is similar to the apparatus of the first embodiment except that the knots of the first embodiment are replaced by stops which are mounted on the cord and which are fabricated from relatively hard material such as metal, wood, plastic or the like.

In accordance with a third embodiment of the invention, a method of producing an animal restraint is disclosed which includes providing a single continuous cord and forming a series of stop knots and a slide knot therein. The stop knots can be overhand knots, while the slide knot can be a Turk's head knot.

DESCRIPTION OF THE DRAWINGS

Preferred embodiments of the invention are described below with reference to the following accompanying drawings.

DETAILED DESCRIPTION OF THE INVENTION

The present invention provides for methods and apparatus for an animal restraint apparatus which comprises a cord and a series of stop knots and a slide knot which are formed thereon. Among the series of knots is a slide knot through which two lengths of the cord pass together to form two adjustable leg holes. A method of producing such an animal restraint is also provided. In an alternative embodiment of the invention, the knots are replaced by a series of stops and a slide which are fabricated from a material such as plastic, metal, or wood.

Figure 4:
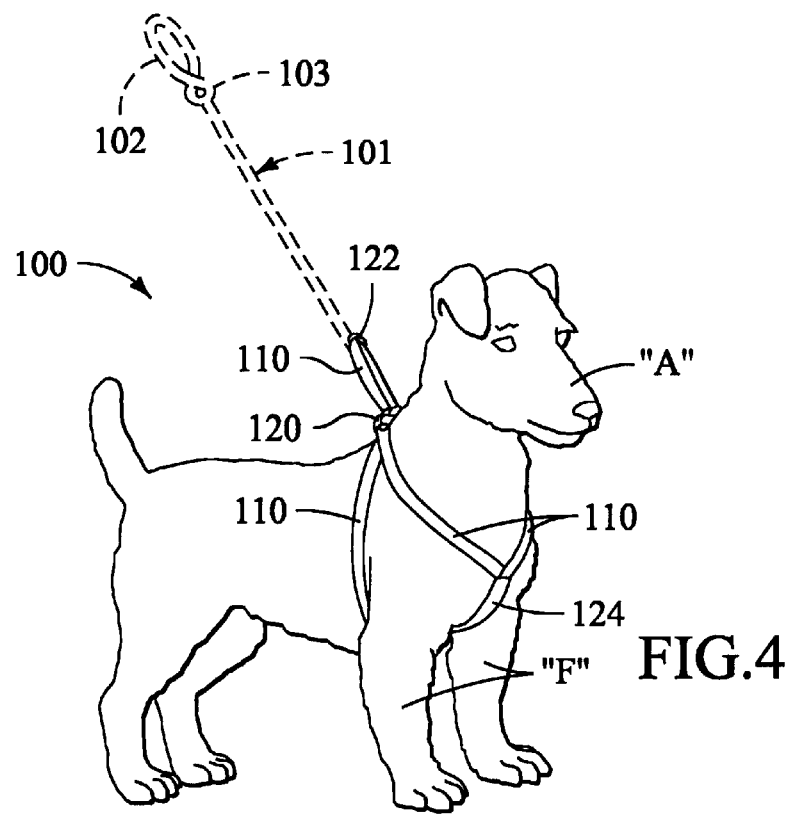
FIG. 4 is an environmental view of an animal restraint apparatus in accordance with a first embodiment of the present invention.

With reference to FIG. 4, an environmental view of an animal restraint apparatus 100 in accordance with a first embodiment of the present invention is shown. As is evident from FIG. 4, only a portion of the restraint apparatus 100 is visible, while the remainder of the restraint apparatus is hidden by an animal "A" by which the apparatus is worn. The animal restraint apparatus 100 can be used on nearly any animal "A" which has fore limbs "F" such as a dog, as shown. That is, although the restraint apparatus 100 is depicted in FIG. 4 to be used on a dog, it is understood that the restraint apparatus can be configured for use on virtually any vertebrate animal having a pair of fore limbs. Such animals can include monkeys, dogs, cats, pigs, hamsters, rats, mice, ferrets, lizards, and frogs.

Preferably, the animal restraint apparatus 100 is constructed from at least one cord 110. By "cord" we mean an elongated, substantially flexible element configured to withstand tensile force, such as a filament, a cable, a rope, a thong, a string, or the like. The cord 110 can be a single, continuous piece, or it can be comprised of a plurality of pieces which are joined together in an end-to-end manner by any of a number of joining means such as knotting, splicing, weaving, or the like.

The cord 110 from which the apparatus 100 is constructed is preferably in the form of rope. Various forms and configurations of rope are known in the art. More preferably, the cord 110 is braided-tube soft-core rope having an easily deformable cross-section. By "easily deformable cross-section" we mean a cross-section of a rope which can be easily flattened, or "squished."

Figure 1:
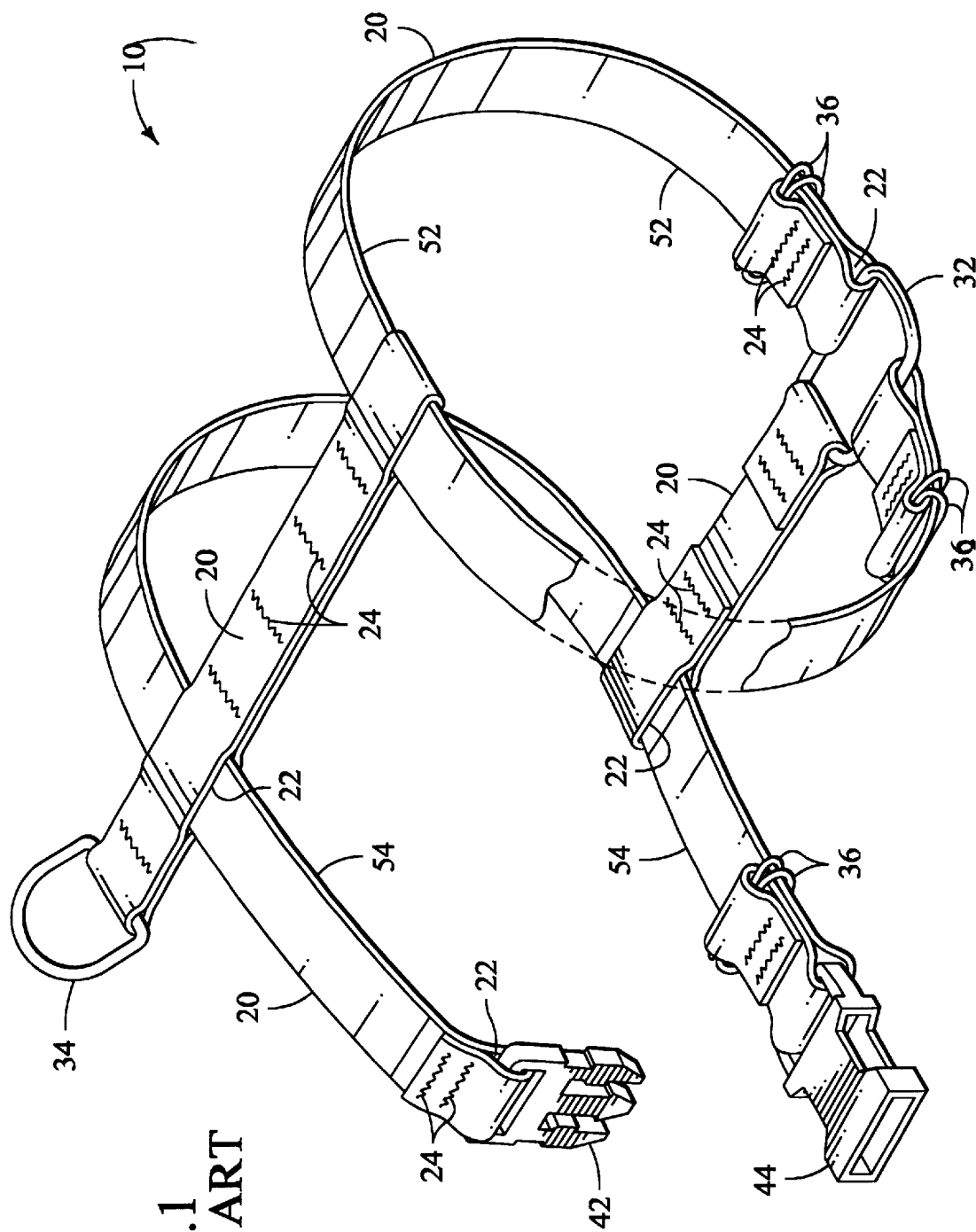
FIG. 1 is a perspective view of a prior art animal restraint.
Figure 2:
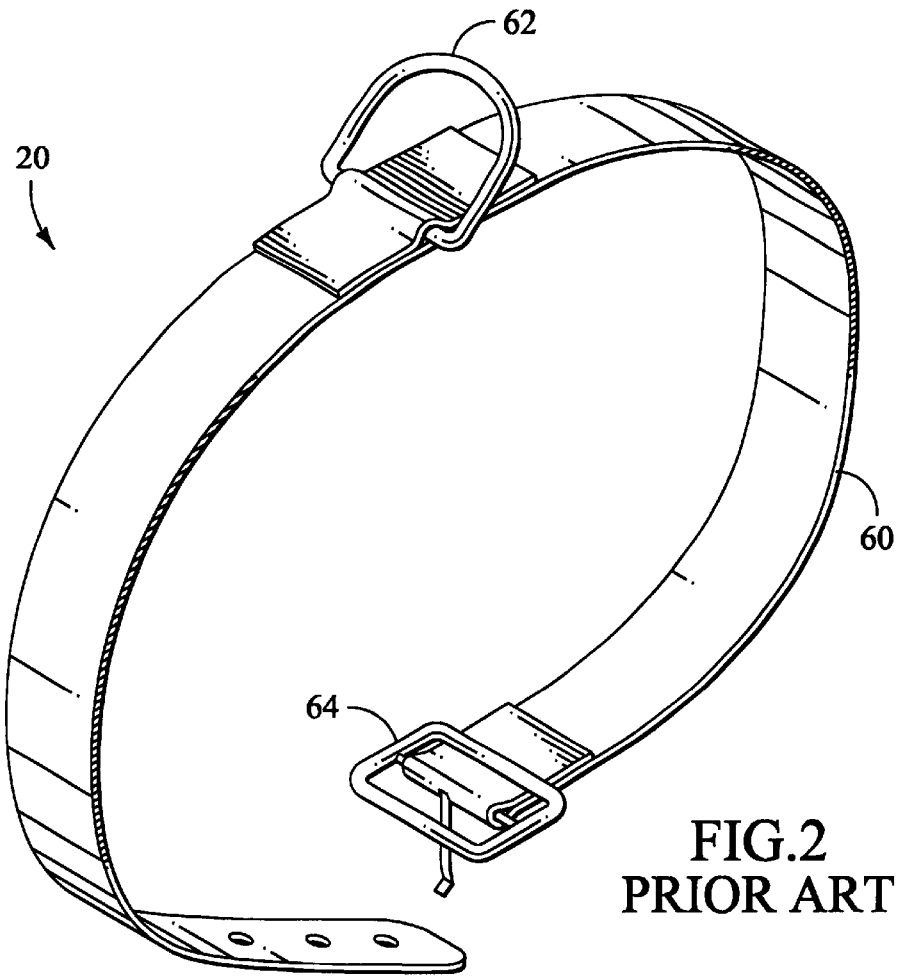
FIG. 2 is a perspective view of another prior art animal restraint.
Figure 3:
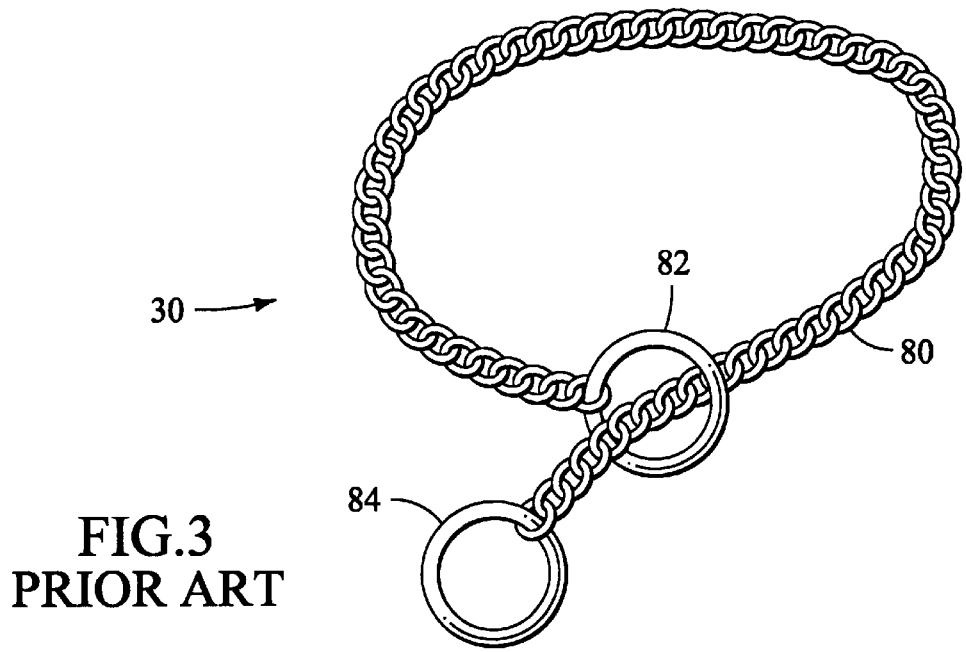
FIG. 3 is a perspective view of yet another prior art animal restraint.

The use of soft rope, and especially the use of rope having an easily deformable cross-section, can provide a comfortable fit of the restraint apparatus 100 by eliminating edges which are present in prior art animal restraint harnesses such as the harness described above for FIG. 1. Furthermore, since rope has no edges, the effects of twists which develop in the apparatus 100 will not be as apparent to the animal "A" as would be in the case of a prior art restraint harness which comprises belting such as that described above.

Preferably, the cord 110 of the apparatus 100 of the present invention is rope which is fabricated from a material comprising nylon, polyester or the like. Such rope is known to possess the qualities of both strength and softness.

Further study of FIG. 4 will reveal that the restraint apparatus 100 comprises a slide knot 120 which can be formed in the cord 110. By "slide knot" we mean any knot formed in a length of cord, wherein the knot defines an opening through which at least one length of cord can be adjustably slid. As is seen, the slide knot 120 is configured to be positioned proximate the base of the neck or center of the upper back of the animal "A" when the restraint apparatus 100 is placed thereon.

The restraint apparatus 100 also comprises a center stop knot 122 formed in the cord 110. By "stop knot" we mean any knot formed in a length of cord which cord passes through the opening of a slide knot, and wherein the stop knot is configured to prevent its passage through the opening, thereby acting as a stop to prevent further passage of the length of cord through the opening of the slide knot. As is seen, the center stop knot 122 is configured to be positioned substantially above the slide knot 120 when the restraint apparatus 100 is placed on the animal "A."

The animal restraint apparatus 100 can further comprise a joint 124 which is configured to be positioned substantially proximate the breast of the animal "A" and between the front two fore limbs "F" when the apparatus is placed on the animal. The joint 124 can be configured to join together at least two lengths of the cord 110 which pass between the two fore limbs "F" of the animal "A." The joint 124 can comprise any means of joining at least two lengths of cord 110 together, including by knotting the cord, by splicing the cord, by stitching the cord, or by passing the cord through a length of tubing, or the like. By "joining" we mean holding, in substantially fixed relation to one another, two or more lengths of cord. By "joint" we mean any means of joining such as by splicing, knotting, stitching, or confining within a tube, among other means.

Figure 5:
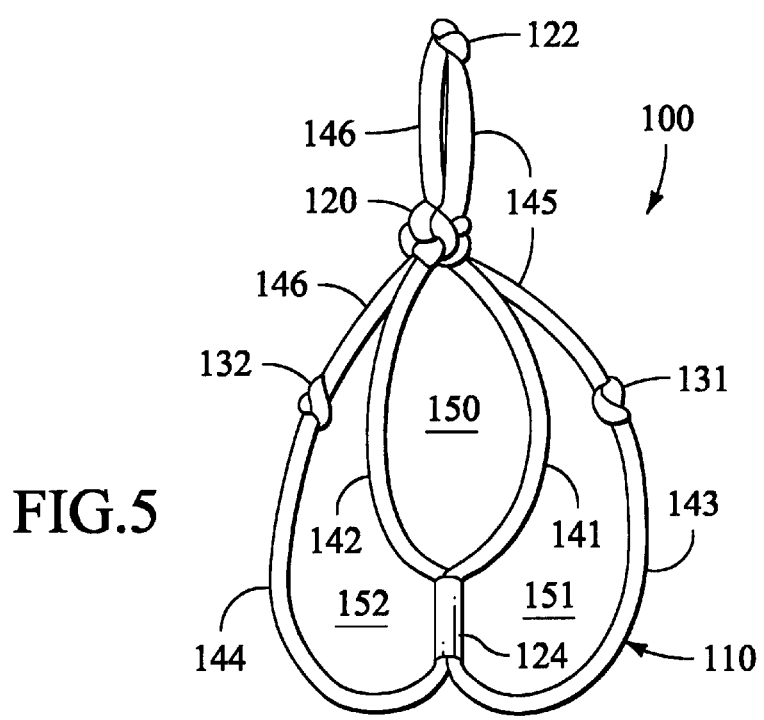
FIG. 5 is a front view of the apparatus in accordance with the first embodiment of the present invention which is depicted in FIG. 4.
Figure 5A:
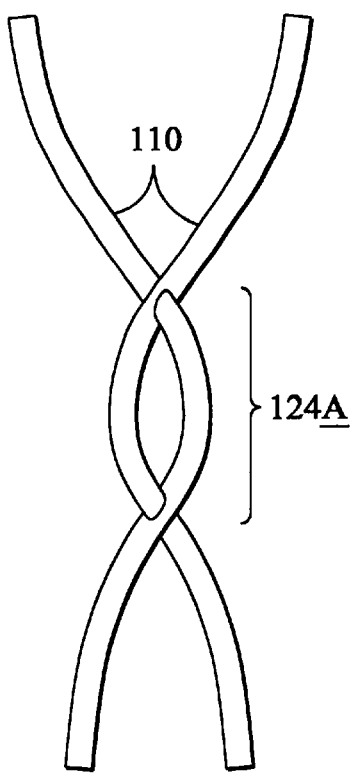
FIG. 5A is a partial top view of a first alternative configuration of a joint of the apparatus depicted in FIG. 5.

For example, referring to FIG. 5A, a partial view of the apparatus 100 is shown which depicts a first alternative joint 124A which can be used in place of the joint 124 depicted in FIG. 5. As seen, the first alternative joint 124A depicted in FIG. 5A is substantially in the form of a splice which joins lengths of cord 110 to one another. Now referring to FIG. 5B, another partial view of the apparatus 100 is shown which depicts a second alternative joint 124B which can be used in place of the joint 124 depicted in FIG. 5.

Figure 5B:
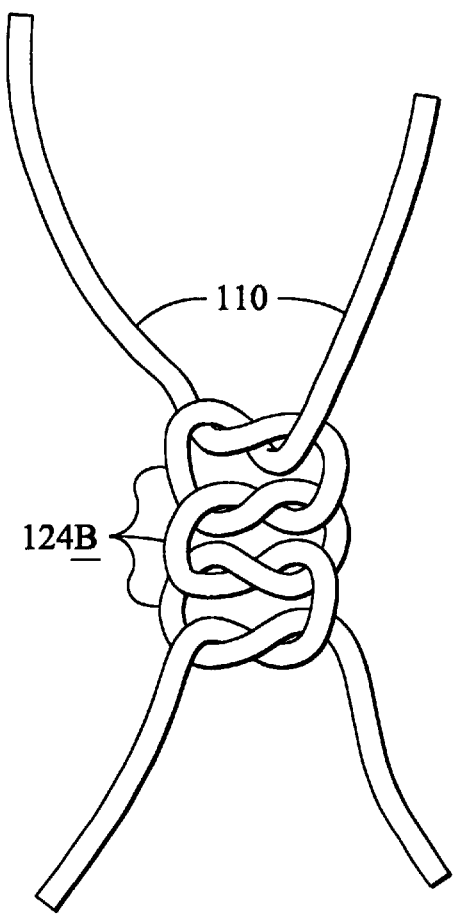
FIG. 5B is a partial top view of a second alternative configuration of a joint of the apparatus depicted in FIG. 5.

As seen, the second alternative joint 124B is substantially in the form of at least one knot which joins lengths of cord 110 to one another. It is understood that various forms of splices and various forms of knots are known which can serve the purpose of the joint 124, and that the alternative depictions thereof rendered in FIGS. 5A and 5B are not intended to limit the joint to any particular form or configuration, but are intended only as illustrative examples of the many possible alternative configurations of the joint.

Preferably, the joint 124 is a tube joint. By "tube joint" we mean a joint which comprises a length of soft, flexible tube, wherein the first and the third cord lengths 141, 143 are defined in a first continuous length which passes through the tube, and wherein the second and the fourth cord lengths 142, 144 are defined in a second continuous length of cord which also passes through the tube in a substantially parallel relation to the first continuous length of cord.

The joint 124 can more preferably be a tube joint which comprises a length of tube which is fabricated from a resilient, soft, flexible, durable material such as neoprene, polyurethane, or the like. Alternatively, the joint 124 can be a tube joint which comprises a length of tube which is heat-shrink tubing. Heat-shrink tubing is known in the art and is generally a tube having a diameter that can be made to shrink when heat is applied thereto. The use of heat-shrink tubing in this manner can facilitate ease of formation of a tube joint with regard to passing the lengths of cord there through.

Now referring to FIG. 5, a front view is shown of the animal restraint apparatus 100 which is described above and depicted in FIG. 4. In addition to the cord 110, the slide knot 120, the center stop knot 122, and the joint 124, which are described above, the restraint apparatus 100 also comprises a first mid stop knot 131, and a second mid stop knot 132. The first mid stop knot 131 and the second mid stop knot 132 are formed in the cord 110 and are configured to function in the manner of the center stop knot 122 as described above. That is, the first mid stop knot 131 and the second mid stop knot 132 are configured to be impassable through the opening of the slide knot 120.

As is evident, the cord 110 has several sections or lengths defined thereon. A first cord length 141 is defined between the slide knot 120 and the joint 124. Likewise, a second cord length 142 is also defined between the slide knot 120 and the joint 124 in a substantially collateral manner with respect to the first cord length 141. The first cord length 141 together with the second cord length 142 define a neck hole 150. As can be deduced by a brief reference to FIG. 4, the neck hole 150 is configured to encircle the lower neck of the animal "A" when the apparatus 100 is placed on the animal.

Moving back to FIG. 5, a third cord length 143 is defined between the joint 124 and the first mid stop knot 131. Likewise, a fourth cord length 144 is defined between the joint 124 and the second mid stop knot 132. A fifth cord length 145 is defined between the first mid stop knot 131 and the center stop knot 122 while passing through the slide knot 120. Similarly, a sixth cord length 146 is defined between the second mid stop knot 132 and the center stop 122 knot while also passing through the slide knot 120 in substantially side-by-side relation to the fifth cord length 145.

As is evident from the above description of the restraint apparatus 100, the first, the second, the third, the fourth, the fifth, and the sixth cord lengths 141, 142, 143, 144, 145, 146 can all be defined on a single continuous piece of cord 110. In other words, as is shown in FIG. 5, the slide knot 120, the center knot 122, and each of the first and second mid stop knots 131, 132 can all be formed on a single continuous piece of cord 110.

Alternatively, the cord 110 can comprise a plurality of cord sections, or lengths, which are connected to one another in an end-to-end manner using any of a number of possible means including by knotting, splicing, or the like. For example, each of the first, the second, the third, the fourth, the fifth, and the sixth cord lengths 141, 142, 143, 144, 145, 146 can be separate lengths which are joined, or connected, to each other in an end-to-end manner by knotting so as to form the apparatus 100.

A further study of FIG. 5 will reveal that the fifth cord length 145 and the sixth cord length 146 are configured to adjustably slide through the slide knot 120 in a substantially concurrent manner. It is also evident that the fifth cord length 145 is configured to adjustably slide through the slide knot 120 between the center stop knot 122 and the first mid stop knot 131, while the sixth cord length 146 is configured to adjustably slide through the slide knot between the center stop knot and the second mid stop knot 132. That is, as the center stop knot 122 is pulled away from the slide knot 120, both the first mid stop knot 131 and the second mid stop knot 132 will approach the slide knot. Conversely, as the first mid stop knot 131 and the second mid stop knot 132 are pulled away from the slide knot 120, the center stop knot 122 will approach the slide knot.

As is seen, a first leg hole 151 is delineated by the first cord length 141, the joint 124, the third cord length 143, and a portion of the fifth cord length 145, wherein the portion of the fifth cord length is defined between the slide knot 120 and the first mid stop knot 131. In a like manner, a second leg hole 152 is delineated by the second cord length 142, the joint 124, the fourth cord length 144, and a portion of the sixth cord length 146, wherein the portion of the sixth cord length is defined between the slide knot 120 and the second mid stop knot 132. As can be deduced by a brief reference to FIG. 4, each of the first and second leg holes 151, 152 are configured to encircle one each respective upper fore leg "F" and shoulder area of the animal "A" when the restraint apparatus 100 is placed on the animal.

Referring to FIG. 5, it is evident that the size of each of the first and second leg holes 151, 152 can be adjusted by sliding the fifth and sixth cord lengths 145, 146 through the slide knot 120. That is, each of the first and second leg holes 151, 152 can be made larger by sliding the fifth and sixth cord lengths 145, 146 through the slide knot 120 such that the first and second mid stop knots 131, 132 are pulled away from the slide knot. Conversely, each of the first and second leg holes 151, 152 can be made smaller by sliding the fifth and sixth cord lengths 145, 146 through the slide knot 120 such that the center stop knot 122 is pulled away from the slide knot.

The center stop knot 122 together with the first mid stop knot 131 and the second mid stop knot 132 provide maximum and minimum limits, respectively, for the sizes of the first leg hole 151 and the second leg hole 152. That is, when the first mid stop knot 131 and the second mid stop knot 132 are pulled away from the slide knot 120, then the first and the second leg holes 151, 152 will increase in size. However, when the center stop knot 122 runs up against the slide knot 120, further increase in size of the first and second legs holes 151, 152 is prevented.

Likewise, when the center stop knot 122 is pulled away from the slide knot 120, the first and the second leg holes 151, 152 will decrease in size. However, after a given decrease in size of the first and the second leg holes, 151, 152, the first mid stop knot 131 and the second mid stop knot 132 will run up against the slide knot 120 to prevent any further decrease in the sizes of the first and the second leg holes.

In order to provide further adjustability of the apparatus 100, each of the first mid stop knot 131 and the second mid stop knot 132 can be configured to be adjustably repositioned relative to the center stop knot 122. For example, in the case wherein the first and the second mid stop knots 131, 132 are each overhand knots formed in the single continuous length of cord 110, then the first and the second mid stop knots can each be loosened and subsequently repositioned on the length of cord before each being tightened once again. In this manner, the minimum size limits of the leg holes 151, 152 which are provided by the first and second mid stop knots 131, 132 can be readjusted as required from time to time for changes in size of the animal "A" by which the apparatus 100 is worn, or to adjust the size of the apparatus so as to fit different animals.

Referring now to both FIGS. 4 and 5, it is seen that the animal restraint apparatus 100 can be easily placed onto the animal "A" by first enlarging the first and second leg holes 151, 152 by adjustably sliding the fifth and sixth cord lengths 145, 146 through the slide knot 120 such that the first and the second mid stop knots 131, 132 are pulled away from the slide knot 120 in the manner described above. Next, the head hole 150 is passed over the head of the animal "A" and placed around the lower neck of the animal as shown.

Each of the fore limbs "F" are then passed through one respective first or second leg hole 151, 152 so that the joint 124 is situated substantially proximate the breast of the animal "A" and between the two fore limbs. Each of the first and second leg holes 151, 152 can then be adjusted to snugly fit the animal "A" by pulling the center stop knot 122 away from the slide knot 120 in the manner discussed above to decrease the size of the first and second leg holes.

If needed, the size of the head hole 150 can be adjusted as well by moving the joint 124 relative to the first, the second, the third, and the fourth cord lengths 141, 142, 143, 144. For example, in the case wherein the joint 124 is a tube joint comprising a length of tubing, the length of tubing can be slid along the cord lengths which pass there through and toward the slide knot 120 so as to shorten the first and the second cord lengths 141, 142. The shortening of the first and the second cord lengths 141, 142 will result in a decrease in the size of the head hole 150. Conversely, by sliding the length of tubing in the opposite direction, away from the slide knot 120, the size of the head hole 150 will be increased.

As revealed by another brief reference to FIG. 4, the restraint apparatus 100 can include a lead, or leash, 101 which comprises at least one length of cord and which can be configured to be releasably connected to the remainder of the restraint apparatus proximate the center stop knot 122. The leash 101 can preferably be fabricated in a manner similar to that of the remainder of the apparatus 100 as described herein for FIGS. 4 and 5. That is, preferably, the leash 101 is fabricated from a single continuous piece of cord having at least one leash knot 103 formed therein. More preferably, the leash 101 can be fabricated from the same type of cord from which the remainder of the apparatus 100 is fabricated. The leash 101 also preferably has at least one loop 102 formed therein to provide a hand-hold, or to provide a connection means by which the leash can be releasably connected to the remainder of the apparatus 100.

Now turning back to FIG. 5, it is evident that the center stop knot 122, the first mid stop knot 131, and the second mid stop knot 132 can comprise any one of a number of knot forms known in the art. Preferably, the center stop knot 122, the first mid stop knot 131, and the second mid stop knot 132 can each comprise a relatively simple knot such as an overhand knot. Overhand knots are well-known in the art, and are quick and easy to form. Likewise, the slide knot 120 can comprise any one of a number of knot forms known in the art. Preferably, however, the slide knot 120 can comprise a Turk's head knot which can be an effective and reliable form of slide knot. Turk's head knots are known in the art. One method of forming a Turk's head knot will now be described below.

Figure 6A:
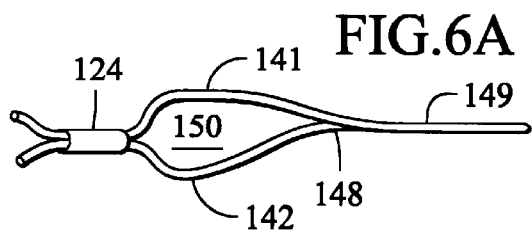
FIGS. 6A through 6J are set of ten sequential instructional diagrams, each corresponding to one of ten steps in a method of forming a Turk's head knot.
Figure 6B:
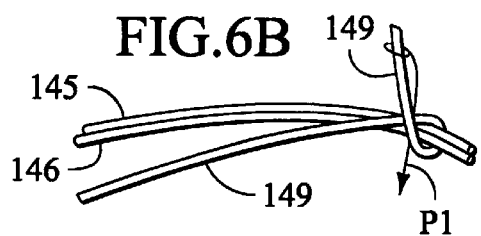

Turning to FIGS. 6A through 6J, a series of sequential instructional diagrams are shown of a method of forming a Turk's head knot, which method comprises ten separate steps. Each of the ten steps of the method of forming a Turk's head knot are briefly described with substantial reliance on the corresponding illustrative diagrams of FIGS. 6A through 6J as follows:

Step 1: With reference to FIG. 6A, the first cord length 141 and second cord length 142 which define the head hole 150 are joined at a splice joint 148 to form a single knotting length 149. The joint 124 is shown for reference.

Figure 6C:
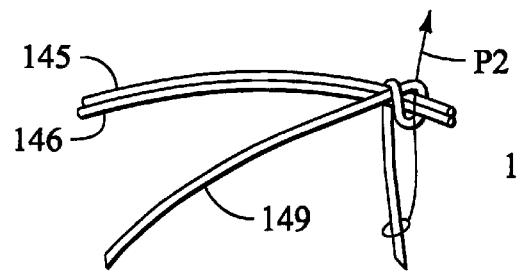

Step 2: Moving to FIG. 6B, the knotting length 149 is wrapped around the fifth and sixth cord lengths 145, 146 so that the knotting length is pointing upward as shown. The knotting length 149 is again wrapped around the fifth and sixth cord lengths 145, 146, as well as itself, as indicated by the first path of movement P1, so as to point downward as depicted in FIG. 6C.

Figure 6D:
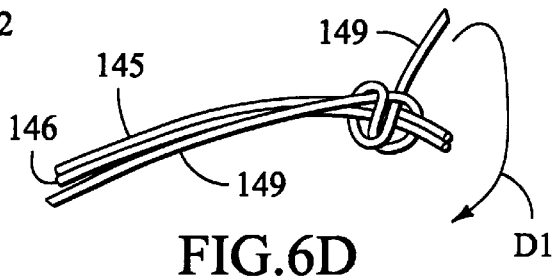

Step 3: Now referring to FIG. 6C, the knotting length 149 is moved upward along the second path of movement P2 so as to again point upward as depicted in FIG. 6D.

Step 4: Referring to FIG. 6D, the entire assembly comprising the fifth and sixth cord lengths 145, 146 as well as the knotting length 149 is rotated approximately a half-turn in the first direction D1 so as to again point downward as depicted in 6E.

Figure 6E:
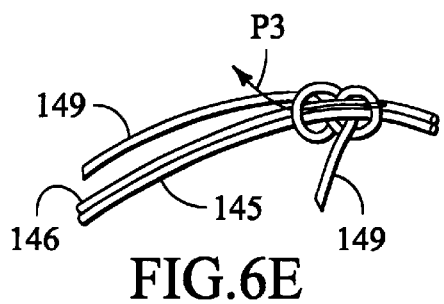
Figure 6F:
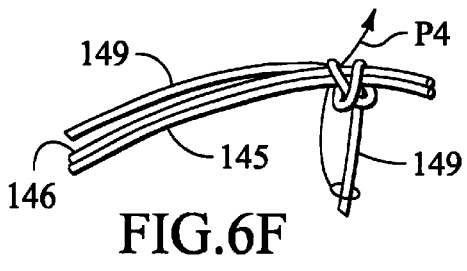

Step 5: As is seen in FIG. 6E, the knotting length 149 is moved as indicated along the third path of movement P3 so as to appear as depicted in FIG. 6F.

Figure 6G:
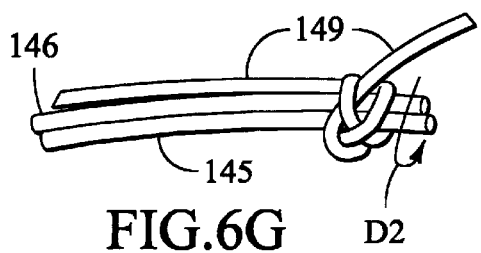

Step 6: Now moving to FIG. 6F, the knotting length 149 is moved as indicated along the fourth path of movement P4 so as to appear as depicted in FIG. 6G.

Figure 6H:
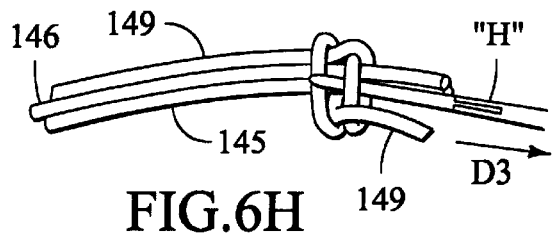

Step 7: As shown in FIG. 6G, the entire assembly comprising the fifth and sixth cord lengths 145, 146 as well as the knotting length 149 is rotated approximately a quarter-turn in the second direction D2 so as to appear as depicted in FIG. 6H.

Figure 6I:
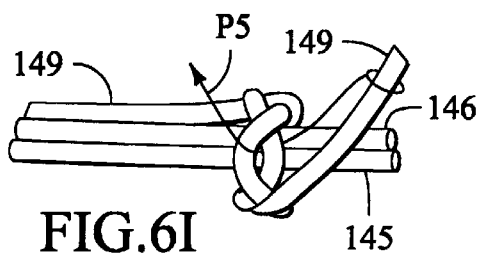

Step 8: Moving to FIG. 6H, a slender elongated gripping tool "H" such as a hemostat is used to grip a portion of the knotting length 149 as shown, and to pull the gripped portion of the knotting length in the third direction D3 so as to appear substantially as shown in FIG. 6I.

Figure 6J:
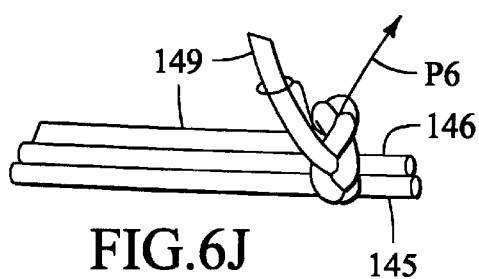

Step 9: Now moving to FIG. 6I, the knotting length 149 is moved as shown along a fifth path of movement P5 so as to appear substantially as depicted in FIG. 6J.

Step 10: Finally, as shown in FIG. 6J, the knotting length 149 is moved along the sixth path of movement P6 as shown, whereupon any protruding portion of the knotting length can be trimmed. The resulting trimmed end of the knotting length 149 can then be sealed by burning to complete the Turk's head knot.

As is evident from the above discussion for FIGS. 4 through 6J, the animal restraint apparatus 100, by comprising cord having knots formed therein, is considerably simplified over prior art apparatus such as the prior art harness discussed above for FIG. 1. Additionally, the apparatus 100 is subject to less wear than similar prior art apparatus because there are fewer parts and components to rub against one another.

Furthermore, because the restraint apparatus 100 can be fabricated from a single continuous piece of cord, the fabrication process of the apparatus in accordance with the present invention is greatly simplified over that of the prior art apparatus as discussed above for FIG. 1. The weight of the apparatus 100 is reduced as well, compared to similar prior art devices, due to the simplified configuration. The apparatus 100 is simpler to use than similar prior art devices because there are no fastener portions to connect as in the prior harness.

Figure 7:
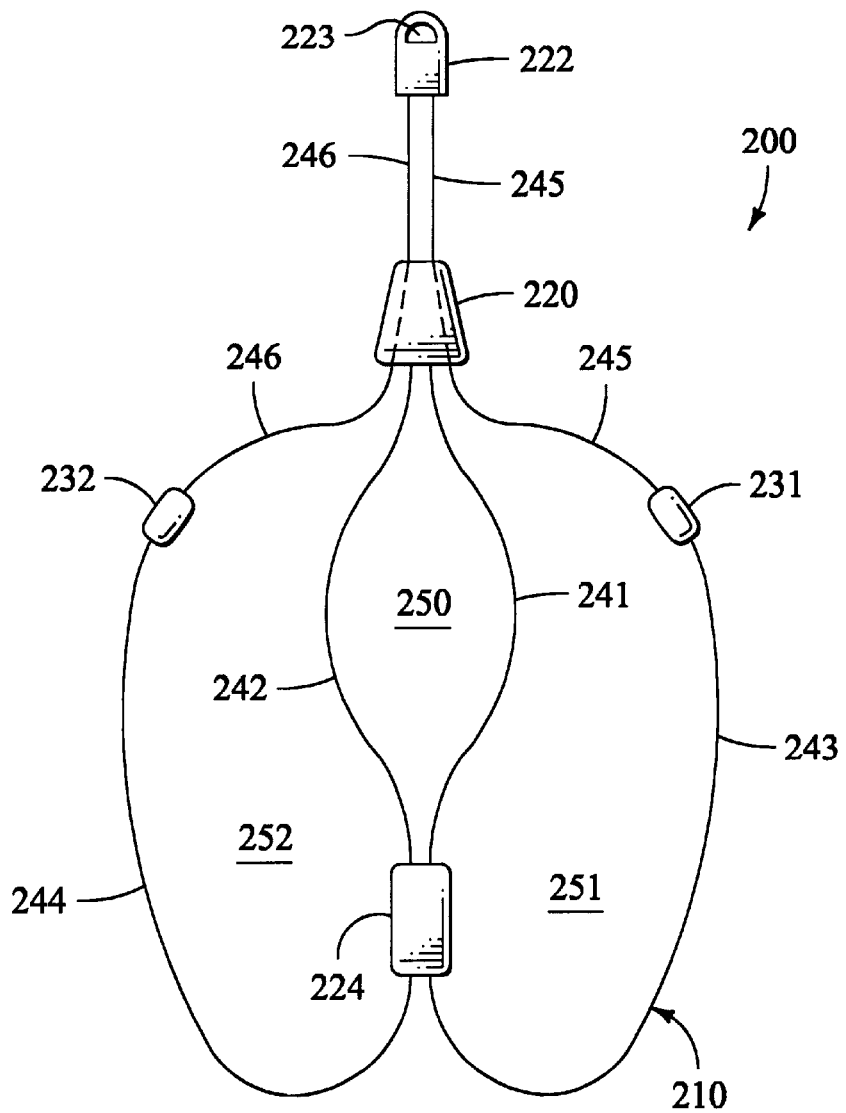
FIG. 7 is a front view of an animal restraint apparatus in accordance with a second embodiment of the present invention.

Now turning to FIG. 7, a front view of an animal restraint apparatus 200 in accordance with a second embodiment of the present invention is shown. As is seen, the restraint apparatus 200 in accordance with the second embodiment of the present invention is configured similarly to the apparatus 100 in accordance with the first embodiment of the present invention and which is described in detail above for FIGS. 4 and 5. That is, the restraint apparatus 200 comprises a slide 220, a center stop 222, a joint 224, first mid stop 231, a second mid stop 232, and a cord 210 which can comprise one or more cord lengths. The center stop can define an eyelet 223 which can be utilized to releasably connect the apparatus 200 to a leash or lead (not shown).

By "a slide" we mean an object through which at least one cord length can be passed so as to be adjustably slidable there through. By "a stop" we mean an object connected to a cord length and which is configured to be impassable through the slide so as to prevent movement of the cord length relative to the slide. The slide 220, the center stop 222, the first mid stop 231, the second mid stop 232, and the joint 224 can be fabricated from a relatively hard material such as metal, wood or the like.

Preferably, the slide 220, the center stop 222, the first mid stop 231, the second mid stop 232, and the joint 224 are fabricated from a material comprising plastic. By "plastic" we mean any of various nonmetallic compounds which are synthetically produced from organic compounds by polymerization, and which can be molded into various shapes and hardened. Alternatively, the joint 224 can be fabricated from a soft flexible material such as neoprene tubing or the like as described above for the apparatus 100.

The restraint apparatus 200 comprises a first cord length 241 and a second cord length 242. Both the first and second cord lengths 241, 242 link the slide 220 to the joint 224 in a substantially collateral manner to define a head hole 250. The restraint apparatus 200 also comprises a third cord length 243 and a fourth cord length 244 which each link the joint 224 to the first mid stop 231 and the second mid stop 232, respectively as shown. Additionally, the apparatus 200 includes a fifth cord length 245 which links the first stop 231 to the center stop 222 and which passes through the slide 220, wherein the fifth cord length is configured to adjustably slide there through.

Likewise, the apparatus 200 includes a sixth cord length 246 which links the second stop 232 to the center stop 222 and which passes through the slide 220 in the manner of the fifth cord length 245. Preferably, the first, the second, the third, the fourth, the fifth, and the sixth cord lengths 241, 242, 243, 244, 245, 246 comprise braided-tube soft-core rope having an easily deformable cross-section as in the case of the apparatus 100 described above. Also, preferably, the first, the second, the third, the fourth, the fifth, and the sixth cord lengths 241, 242, 243, 244, 245, 246 are fabricated from a material such as nylon, polyester, or the like.

The first and the second cord lengths 241, 242 define a head hole 250. The first, and the third cord lengths 241, 242, along with at least a portion of the fifth cord length 245 define a first leg hole 251. Similarly, the second, and the fourth cord lengths 242, 244, along with at least a portion of the sixth cord length 246 define a second leg hole 252. The apparatus 200 can be adjusted in the manner of the apparatus 100 which is described above.

That is, the first and the second leg holes 251, 252 can be enlarged by pulling the respective first mid stop 231 and the second mid stop 232 away from the slide 220. Contrarily, the first and the second leg holes 251, 252 can be made smaller by pulling the center stop 222 away from the slide 220. The apparatus 200 can be placed onto an animal in the manner of the apparatus 100 in accordance with the first embodiment of the invention as described above for FIGS. 4 and 5.

With reference to FIG. 7, it is understood that the joint 224 can be adjustably connected to the first, the second, the third, and the fourth cord lengths 241, 242, 243, 244, in which case the first and the third cord lengths can be a single continuous length of cord while the second and fourth cord lengths can also be a single continuous length of cord. That is, in the case wherein the first and the third cord lengths 241, 243 are a single continuous length of cord, and the second and fourth cord lengths 242, 243 are a single length of cord, the joint 224 can be configured to adjustably slide along the continuous lengths of cord from which the first, the second, the third, and the fourth cord lengths are defined. In the alternative, the joint 224 can be fixedly connected to the first, the second, the third, and the fourth cord lengths 241, 242, 243, 244.

It is understood that the cord 210 can comprise a single continuous piece of cord to which the center stop 222, the first mid stop 231, and the second mid stop 232 are connected. That is, the first cord length 241, the second cord length 242, the third cord length 243, the fourth cord length 244, the fifth cord length 245 and the sixth cord length 246, as well as various combinations thereof, can be defined on one single continuous piece of cord.

Alternatively, the cord 210 can comprise various individual cord lengths. That is, the first cord length 241, the second cord length 242, the third cord length 243, the fourth cord length 244, the fifth cord length 245 and the sixth cord length 246, or various combinations thereof, can each be individual cord lengths which are combined to make up the apparatus 200.

Figure 8:
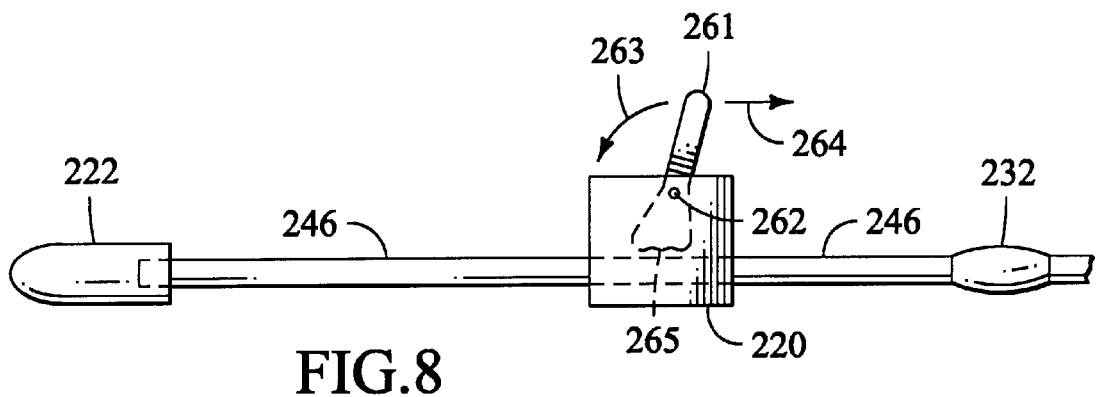
FIG. 8 is a partial side view showing a possible configuration of a lock device for the apparatus which is depicted in FIG. 7.

Moving to FIG. 8, a partial side elevation view of the apparatus 200 is shown. As depicted, the slide 220 can include a limiting device such as the lock device 261. The purpose of the lock device 261 is to selectively prevent movement of the sixth cord length 246, as well as the fifth cord length (shown in FIG. 6) in the direction 264 relative to the slide 220. By keeping the sixth cord length 246 from moving in the direction 264 relative to the slide 220, the second leg hole 252 (shown in FIG. 7) is substantially prevented from inadvertent enlargement once the apparatus 200 has been placed on an animal and adjusted for proper fit.

The lock device 261 is supported on the slide 220 and is configured to pivot relative to the slide 220 in the direction 263 about a pivot point 262. The lock device 261 can be equipped with teeth 265 which are configured to grip the sixth cord length 246. To assist in its function, the lock device 261 can be biased in the direction 263 by a resilient member (not shown) such as a spring or the like. To release the lock device 261, such as when removing the restraint apparatus 200 from an animal, the user can rotate the lock device in a direction opposite to the direction 263.

Although only the sixth cord length 246 is visible in FIG. 8, it is understood that the lock device 261 can be configured to act on any cord length which passes through the slide 220, such as the fifth cord length as depicted in FIG. 7. Furthermore, it is understood that such lock devices are known in the art and that various other configurations of lock devices which achieve a similar purpose are available. Therefore, it is understood that the stop 261 is exemplary of but one possible configuration which is included for the purpose of illustrating the general functionality and purpose of such a lock device, and which is not meant to limit the configuration or structure of such a device to that which is specifically shown and depicted herein.

In accordance with a third embodiment of the present invention, a method of fabricating an animal restraint apparatus is provided. The method includes providing a single continuous piece of cord and forming a center stop knot in the piece of cord. A first mid stop knot can be formed in the piece of cord to define a first cord length between the center stop knot and the first mid stop knot. Likewise, the method can include forming a second mid stop knot in the piece of cord to define a second cord length between the center stop knot and the second mid stop knot.

The method can also include forming a slide knot in the piece of cord, wherein the first cord length and the second cord length slidably pass there through. In accordance with the method, the slide knot can be a Turk's head knot. The center stop knot, the first mid stop knot, and the second mid stop knot can each be overhand knots. The method can also include defining a head hole, a first leg hole, and a second leg hole with the continuous piece of cord.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An animal restraint apparatus, comprising:
   a first cord length;
   a second cord length;
   a slide knot at which the first cord length connects with the second cord length;
   a third cord length;
   a fourth cord length;
   a joint at which the first, the second, the third, and the fourth cord lengths join;
   a fifth cord length which passes through the slide knot;
   a sixth cord length which passes through the slide knot;
   a center stop knot at which the fifth cord length connects with the sixth cord length;
   a first mid stop knot at which the third cord length connects with the fifth cord length;
   a second mid stop knot at which the fourth cord length connects with the sixth cord length; and,
   wherein:
      the first cord length is defined between the slide knot and the joint;
      the second cord length is defined between the slide knot and the joint in substantially collateral relation with the first cord length;
      the third cord length is defined between the joint and the first mid stop knot;
      the fourth cord length is defined between the joint and the second mid stop knot;
      the fifth cord length is defined between the first mid stop knot and the center stop knot and is configured to adjustably slide through the slide knot;
      the sixth cord length is defined between the second mid stop knot and the center stop knot and is configured to adjustably slide through the slide knot in substantially collateral relation with the fifth cord length.

2. The animal restraint apparatus of claim 1, and wherein:
   the first cord length, the second cord length, the third cord length, the fourth cord length, the fifth cord length, and the sixth cord length are defined on a single continuous piece of cord, and, the center stop knot, the first mid stop knot, and the second mid stop knot are formed in the single continuous piece of cord.

3. The animal restraint apparatus of claim 2, and wherein the single continuous piece of cord is braided rope.

4. The animal restraint apparatus of claim 3, and wherein braided rope is fabricated from a material selected from the group consisting of nylon and polyester.

5. The animal restraint apparatus of claim 1, and wherein the joint comprises a cord splice.

6. The animal restraint apparatus of claim 1, and wherein the joint comprises a knot.

7. The animal restraint apparatus of claim 1, and wherein the joint is a tube joint.

8. The animal restraint apparatus of claim 7, and wherein the tube joint comprising heat-shrink tubing which is used in forming the tube joint.

9. The animal restraint apparatus of claim 1, and wherein the slide knot comprises a Turk's head knot.

10. The animal restraint apparatus of claim 1, and wherein the center stop knot comprises an overhand knot.

11. The animal restraint apparatus of claim 1, and wherein the first mid stop knot and the second mid stop knot each comprise an overhand knot.

12. The animal restraint apparatus of claim 1, and further comprising a releasably attachable leash.

13. The animal restraint apparatus of claim 12, and wherein the leash comprises braided rope.

14. An animal restraint apparatus comprising:
a first cord length;
a second cord length;
a slide which connects to the first cord length and the second cord length;
a third cord length;
a fourth cord length;
a joint at which the first, the second, the third, and the fourth cord lengths join;
a fifth cord length which passes through the slide;
a sixth cord length which passes through the slide;
a center stop which connects to the fifth cord length and the sixth cord length;
a first mid stop which connects to the third cord length and the fifth cord length;
a second mid stop which connects to the fourth cord length and the sixth cord length; and,
wherein:
the first cord length is defined between the slide and the joint;
the second cord length is defined between the slide and the joint in substantially collateral relation with the first cord length;
the third cord length is defined between the joint and the first mid stop;
the fourth cord length is defined between the joint and the second mid stop;
the fifth cord length is defined between the first mid stop and the center stop and is configured to adjustably move through the slide;
the sixth cord length is defined between the second mid stop and the center stop and is configured to adjustably move through the slide in substantially collateral relation with the fifth cord length.

15. The animal restraint device of claim 14, and further comprising a lock device supported on the slide and configured to selectively prevent movement of the fifth cord length and the sixth cord length relative to the slide.

16. The animal restraint device of claim 14, and wherein the center stop, the first mid stop, and the second mid stop are fabricated from a material selected from the group consisting of wood, metal, and plastic.

17. The animal restraint device of claim 14, and wherein the slide is fabricated from a material selected from the group consisting of wood, metal, and plastic.

18. A method of producing an animal restraint comprising:
providing a single continuous piece of cord;
forming a center stop knot in the piece of cord;
forming a first mid stop knot in the piece of cord to define a first cord length between the center stop knot and the first mid stop knot;
forming a second mid stop knot in the piece of cord to define a second cord length between the center stop knot and the second mid stop knot; and,
forming a slide knot in the piece of cord, wherein the first cord length and the second cord length are configured to adjustably slide through the slide knot.

19. The method of claim 18 and further comprising forming a tube joint in the continuous piece of cord.

20. The method of claim 18, and wherein the slide knot is a Turk's head knot.

21. The method of claim 18, and wherein the center stop knot, the first mid stop knot, and the second mid stop knot are each overhand knots.

* * * * *